(12) United States Patent
Leroy et al.

(10) Patent No.: US 12,360,502 B1
(45) Date of Patent: Jul. 15, 2025

(54) USING A MACHINE-LEARNING MODEL TO REFINE A DIGITAL TWIN OF RENEWABLE ENERGY SYSTEM

(71) Applicant: BRIGHTNIGHT POWER LLC, West Palm Beach, FL (US)

(72) Inventors: Cédric Leroy, Austin, TX (US); Mohit Aggarwal, Austin, TX (US)

(73) Assignee: BRIGHTNIGHT POWER LLC, West Palm Beach, FL (US)

( * ) Notice: Subject to any disclaimer, the term of this patent is extended or adjusted under 35 U.S.C. 154(b) by 0 days.

(21) Appl. No.: 18/896,796

(22) Filed: Sep. 25, 2024

(51) Int. Cl.
*G05B 13/04* (2006.01)
*G05B 13/02* (2006.01)

(52) U.S. Cl.
CPC ....... *G05B 13/042* (2013.01); *G05B 13/0265* (2013.01)

(58) Field of Classification Search
CPC .................. G05B 13/042; G05B 13/0265
See application file for complete search history.

(56) References Cited

U.S. PATENT DOCUMENTS

| | | | | |
|---|---|---|---|---|
| 7,742,897 | B2 * | 6/2010 | Herzig | H02J 13/00016 702/182 |
| 10,599,747 | B1 * | 3/2020 | Hoff | G06Q 50/06 |
| 2011/0082597 | A1 * | 4/2011 | Meagher | H02J 3/38 700/291 |
| 2011/0184583 | A1 * | 7/2011 | El-Barbari | H02S 50/10 700/297 |
| 2011/0276269 | A1 * | 11/2011 | Hummel | G01W 1/10 702/3 |
| 2011/0282601 | A1 * | 11/2011 | Hoff | H02J 3/381 702/60 |
| 2015/0094969 | A1 * | 4/2015 | Jungerman | H02S 50/10 702/61 |
| 2017/0286838 | A1 * | 10/2017 | Cipriani | G06N 20/00 |
| 2020/0096958 | A1 * | 3/2020 | Kelly | G06Q 10/08 |

FOREIGN PATENT DOCUMENTS

CN 117353631 A 1/2024

OTHER PUBLICATIONS

Camopo Energy, "Boost the profitability of your hybrid power plant", SMA Solar Technology AG, 2024.
Camopo Energy, "Commercial Optimization Software for Hybrid Power Plants with an integrated full-scope EMS", SMA Solar Technology AG, 2024.
Shibl, et al. "An Intelligent Two-Stage Energy Dispatch Management System for Hybrid Power Plants: Impact of Machine Learning Deployment", IEEE Access, vol. 11, p. 13091-13102, 2023.

* cited by examiner

*Primary Examiner* — Christopher E. Everett
(74) *Attorney, Agent, or Firm* — FOLEY & LARDNER LLP

(57) ABSTRACT

A method may include initializing a simulation of a renewable energy plant with an initial set of plant parameters, simulating a first output of the renewable energy plant based on first environmental factors and the initial set of plant parameters, executing a machine-learning model using as input the first simulated output of the renewable energy plant and an actual output of the renewable energy plant to generate an updated set of plant parameters, and simulating a second output of the renewable energy plant based on second environmental factors and the updated set of plant parameters.

18 Claims, 6 Drawing Sheets

USING A MACHINE-LEARNING MODEL TO REFINE A DIGITAL TWIN OF RENEWABLE ENERGY SYSTEM

BACKGROUND

Renewable energy systems, such as renewable energy power plants, may be simulated or modeled using digital twins to predict an output of the renewable energy systems. Inaccurate predictions of output based on inaccurate digital twins may reduce an efficiency of the renewable energy systems, as control signals may be generated in response to inaccurate predictions.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

FIG. 4 is an example grid illustrating irradiance correction factors for diffuse horizontal irradiance (DHI).

DETAILED DESCRIPTION

Figure 1:
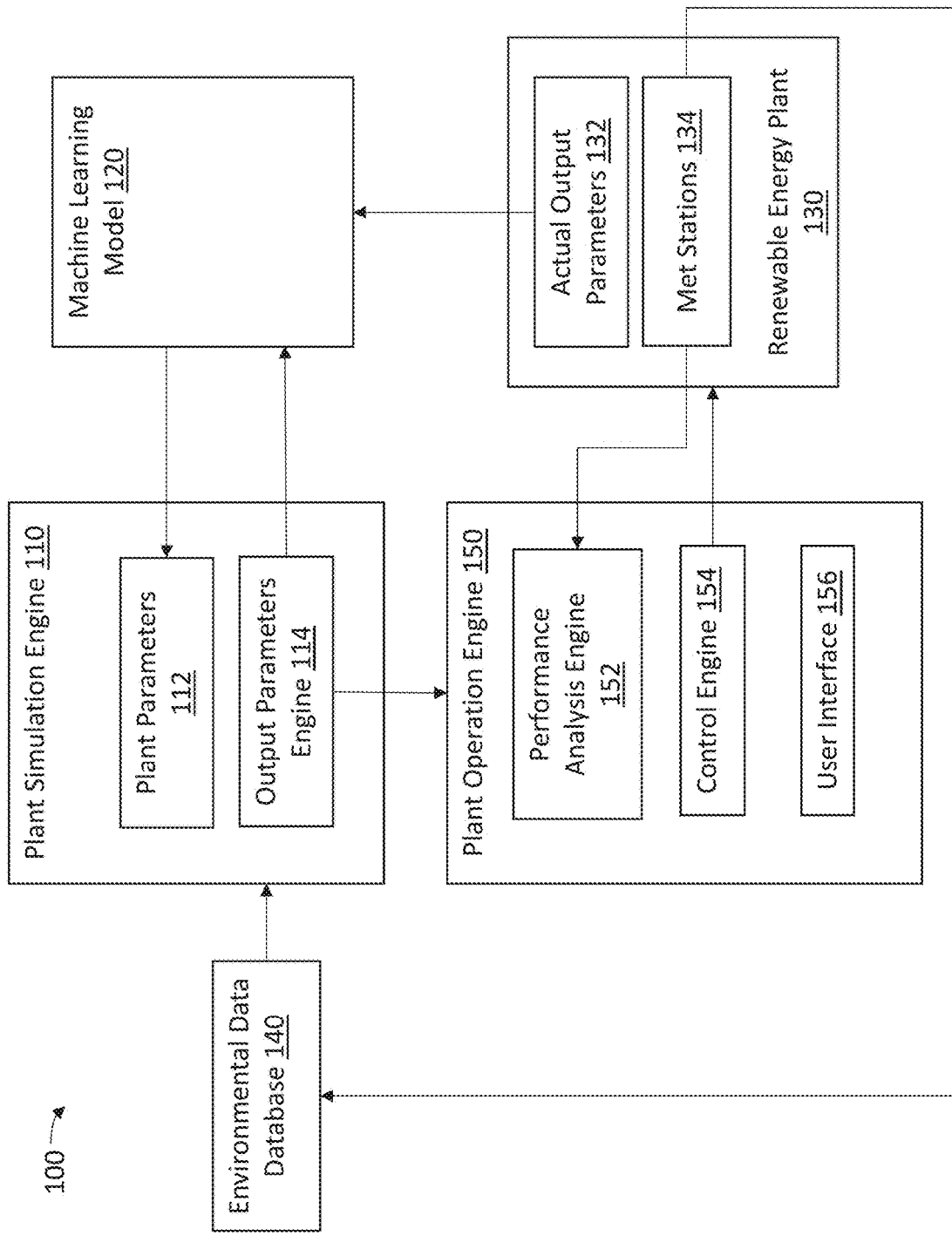
FIG. 1 is a block diagram of an example computing system for using a machine-learning model to refine parameters of a renewable energy plant.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Predictions of renewable energy system (e.g., renewable energy power plant) output are used to design renewable energy systems, maintain renewable energy systems, identify degradation or inefficiencies in renewable energy systems, and control renewable energy systems, among other uses. Accurate output predictions serve to reduce degradation of system components, increase an effective output of renewable energy systems, and more efficiently control power production. For example, reducing ramp-up rates of various power-generation and power-storage components based on accurate output predictions can reduce degradation and prolong component lifetime. In another example, accurate output predictions can be used to more efficiently use available power-generation resources by maximizing use of resources that have near-zero marginal costs, such as PV arrays. In another example, accurate output predictions can be used to output power that matches a target power profile with a high degree of certainty, allowing for more consistent delivery of power. Embodiments and examples discussed herein provide for generating accurate output predictions for renewable energy systems by refining parameters of digital twins of renewable energy systems using a machine-learning model. The machine-learning model can be executed using as input a predicted output from the digital twin and an actual output from the actual renewable energy system to modify parameters of the digital twin to reduce a difference between the predicted output and the actual output. In this way, the digital twin can be updated to accurately reflect how the renewable energy system responds to environmental conditions such as weather, solar irradiance, wind, temperature, and other conditions. By refining the digital twin, using the machine-learning model, various interrelated parameters of the renewable energy system can be identified and applied to the digital twin. Identifying the parameters of the renewable energy system can allow for detection and diagnosis of issues with the renewable energy system such as component degradation, wire losses, and sub-optimal control. By refining the digital twin to match the parameters of the actual renewable energy system, predictions of system response and output generated using the digital twin can be used to accurately control the actual renewable energy system. Improved control of the actual renewable energy system can decrease a degradation of components of the renewable energy system, increase an efficiency of output of the renewable energy system, and provide for more consistent power delivery.

FIG. 1 is a block diagram of an example computing system 100 for using a machine-learning model to refine parameters of a renewable energy plant. The system 100 includes a plant simulation engine 110, a machine-learning model 120, a renewable energy plant 130, an environmental data database 140, and a plant operation engine 150.

The plant simulation engine 110 may simulate the renewable energy plant 130 to predict behavior and/or an output of the renewable energy plant 130. The renewable energy plant 130 may include one or more renewable energy generation devices (e.g., PV arrays, wind turbines, hydroelectric turbines, etc.), one or more energy storage devices (e.g., lithium ion, iron, compressed air, etc.), inverters, sensors, one or more substations, one or more transformers, and a point of interconnect (POI) to a utility grid. The renewable energy plant 130 may include one or more controllers to modify control signals of the components of the renewable energy plant 130 such as inverter setpoints, energy storage device charge/discharge, PV array tilt, and other parameters.

The plant simulation engine 110 may include plant parameters 112 of the renewable energy plant 130. The plant parameters 112 may include parameters of the renewable energy plant such as a number of PV arrays, a model or type of the PV arrays, a location of the PV arrays, a number of wind turbines, a model or type of the wind turbines, a location of the wind turbines, a number of energy storage devices, a model or type of the energy storage devices, a location of the energy storage devices, a number of inverters, a model or type of the inverters, auxiliary losses, transmission line losses, light-induced degradation of the PV arrays and/or inverters, DC wire losses for the PV arrays and/or inverters, module quality of the PV arrays and/or inverters, slope azimuth for the PV arrays and/or inverters, slope tilt for the PV arrays and/or inverters, soiling losses for the PV arrays, module degradation rates for the PV arrays and/or inverters, AC wire losses for the inverters, and connections between the various plant components. In some implementations, the plant parameters 112 may be initialized by a user. In an example, a user indicates the various components of the renewable energy plant 130, the types or model numbers of the plant components, and their locations.

The output parameters engine 114 may use the plant parameters 112 to simulate the renewable energy plant 130 and its output in response to various environmental factors such as solar irradiance, cloud coverage, wind, temperature, precipitation, and other factors. In an example, the output parameters engine 114 simulates an output of a PV array of the renewable energy plant 130 by modeling shadows from adjacent wind turbines, energy storage devices, buildings, geographic features, and clouds, simulates an output of a wind turbine based on wind data, and simulates a charge of an energy storage device based on the simulated output of the PV array and the simulated output of the wind turbine compared to a target power profile. The output parameters engine 114 may receive environmental data from the environmental data database 140 to generate predicted output parameters of the renewable energy plant 130. The predicted output parameters can include a predicted output of the renewable energy plant 130 (e.g., MW, voltage, frequency, etc.). In some implementations, the predicted output parameters include predicted outputs of components of the renewable power plant such as PV array outputs, wind turbine outputs, energy storage device charge/discharge, and inverter inputs and outputs. In an example, the predicted output parameters include a predicted output for each inverter of a plurality of inverters of the renewable energy plant 130. In an example, the predicted output parameters include a predicted output for each PV array of a plurality of PV arrays of the renewable energy plant 130. In an example, the predicted output parameters include a predicted state of charge for each energy storage device of a plurality of energy storage devices of the renewable energy plant 130.

The plant simulation engine 110 receives environmental data from the environmental data database 140. In an example, the environmental data indicates a temperature, humidity, temperature, cloud cover, and solar irradiance for a calendar day. In this example, the output parameters engine 110 applies the environmental data for the calendar day to the plant parameters 112 to predict an output of the renewable energy plant 130 for the calendar day. The environmental data database 140 can include historical weather data and/or irradiance data from satellites, forecast weather data and/or irradiance data from satellites, and other measurements of weather data and/or irradiance data, such as from meteorological stations 134 of the renewable energy plant 130. The solar irradiance data may include general horizontal irradiance (GHI), direct normal irradiance (DNI), and diffuse horizontal irradiance (DHI).

In some implementations, the environmental data database 140 includes environmental data in fifteen-minute increments, such that the output prediction for the renewable energy plant 130 generated by the output parameters engine 114 can be generated in fifteen-minute increments, providing for granular predictions of output. The environmental data can be based on a variety of measurements, such as satellite images, radar measurements, humidity measurements, temperature measurements, irradiance measurements, and other measurements.

In some implementations, the environmental data database 140 includes forecasts of the environmental data. The output parameters engine 114 can use the forecasts to generate the output prediction. In an example, the forecasts of the environmental data are for a subsequent calendar day, allowing the output parameters engine 114 to generate an output prediction for the subsequent calendar day. In an example, the forecasts of the environmental data are for a subsequent hour, allowing the output parameters engine 114 to generate an output prediction for the subsequent hour. In an example, the forecasts of the environmental data include forecasts for a range of future times and are updated every fifteen minutes, allowing the output parameters engine 114 to generate output predictions for the range of future times, updating the output predictions every fifteen minutes.

The output parameters engine 114 can provide the predicted output parameters, or output prediction, to the machine-learning model 120. The machine-learning model 120 can receive actual output parameters 132 from the renewable energy plant 130. The predicted output parameters and the actual output parameters 132 can be based on the same environmental data. In an example, environmental data for a calendar day is recorded in fifteen-minute increments and the actual output parameters 132 of the renewable energy plant 130 are record in fifteen-minute increments. In this example, the output parameters engine 114 applies the environmental data to the plant parameters to generate predicted output parameters in fifteen-minute increments such that the predicted output parameters and the actual output parameters 132 can be compared. The machine-learning model 120 is executed using as input the predicted output parameters and the actual output parameters 132 to generate updated plant parameters.

The machine-learning model 120 may compare the predicted output parameters and the actual output parameters 132 and generate updated plant parameters to reduce a difference between the predicted output parameters and the actual parameters 132. The updated plant parameters generated by the machine-learning model 120 may include parameters that may not accurately reflect the renewable energy plant 130. In an example, the updated plant parameters may include wire losses, PV array efficiencies, shading of PV arrays, wind turbine efficiencies, energy storage device degradation, and other parameters, but not clearly-defined parameters such as a number of PV arrays, a number of energy storage devices, a number of inverters, and relative locations of plant parameters. In this way, the machine-learning model 120 refines parameters that may not accurately reflect the renewable energy plant 130. In some implementations, the machine-learning model 120 generates updated plant parameters for plant parameters that are estimated or nominal, not measured. In this way, the machine-learning model 120 maintains those plant parameters which are known and updates those plant parameters that are not known, or which are estimated. In some implementations, the machine-learning model 120 provides correction factors, or adjustment factors for the plant parameters 112 and/or the predicted output parameters. In this way, the machine-learning model 120 can adjust the plant parameters 112 and/or the predicted output parameters without changing the nominal or entered values of the plant parameters 112. Instead, the correction or adjustment factors can be applied to the plant parameters 112 and/or the predicted output parameters to reduce a difference between the predicted output parameters and the actual output parameters 132.

In some implementations, the actual output parameters 132 include actual environmental data from meteorological stations (met stations) 134 of the renewable energy plant 130. The meteorological stations 134 can collect the actual environmental data using wind sensors, thermometers, irradiance sensors, and other sensors for collecting the actual environmental data. The actual environmental data may include the same parameters as in the environmental data from the environmental data database 140. In some implementations, the meteorological stations 134 provide the actual environmental data to the environmental data database 140 so the environmental data database 140 includes the actual environmental data. The actual output parameters 132 can be correlated with the actual environmental data from the meteorological stations 134 to indicate which actual environmental data resulted in which actual output parameters 132. In an example, the actual environment data includes time series data where the times in the actual environment data correspond to times in time series data of the actual output parameters 132.

The machine-learning model 120 provides the updated plant parameters to the plant simulation engine 110 to update the plant parameters 112 of the plant simulation engine 110. In some implementations, the machine-learning model 120 generates the updated plant parameters using the plant simulation engine 110 by comparing predicted output parameters generated using variations on plant parameters to determine which plant parameters result in predicted output parameters that most closely align with the actual output parameters 132. The plant parameters 112, as updated by the machine-learning model 120 may be used in generating subsequent predicted output parameters.

The plant parameters 112, as updated by the machine-learning model 120 may indicate degradation of components of the renewable energy plant 130, wire losses between components of the renewable energy plant 130, and/or sub-optimal control of components of the renewable energy plant. In an example, the updated plant parameters indicate that an output of a PV array is below a nominal output of the PV array, indicating degradation or soiling of the PV array. In an example, the updated plant parameters indicate wire losses between PV arrays and inverters, indicating degradation of the wires or a design flaw in the renewable energy plant 130. In an example, the updated plant parameters indicate accelerated degradation of an energy storage device, indicating degradation of the energy storage device that may be caused by rapid charge/discharge or depleting a charge of the energy storage device below a predetermined threshold. In some implementations, the machine-learning model 120 generates an alert regarding one or more components of the renewable energy plant 130, such as an alert of component degradation, soiling, wire loss, or sub-optimal control. In some implementations, the alert includes an indication of reduced performance or output and a predicted cause, such as component degradation, soiling, design flaw, or sub-optimal control.

A plant operation engine 150 may receive the predicted output parameters from the output parameters engine 150 to determine control parameters, or dispatch parameters, for the renewable energy plant 130. The plant operation engine 150 may be used to monitor and/or control the renewable energy plant 130. In some implementations, the plant operation engine 150 is part of the renewable energy plant 130. In some implementations, the plant operation engine 150 is separate from the renewable energy plant 130. In an example, the plant operation engine 150 is cloud-based and provides control signals and/or dispatch to the renewable energy plant 130 from the cloud. The plant operation engine 150 can include a performance analysis engine 152, a control engine 154, and a user interface 156.

Figure 2:
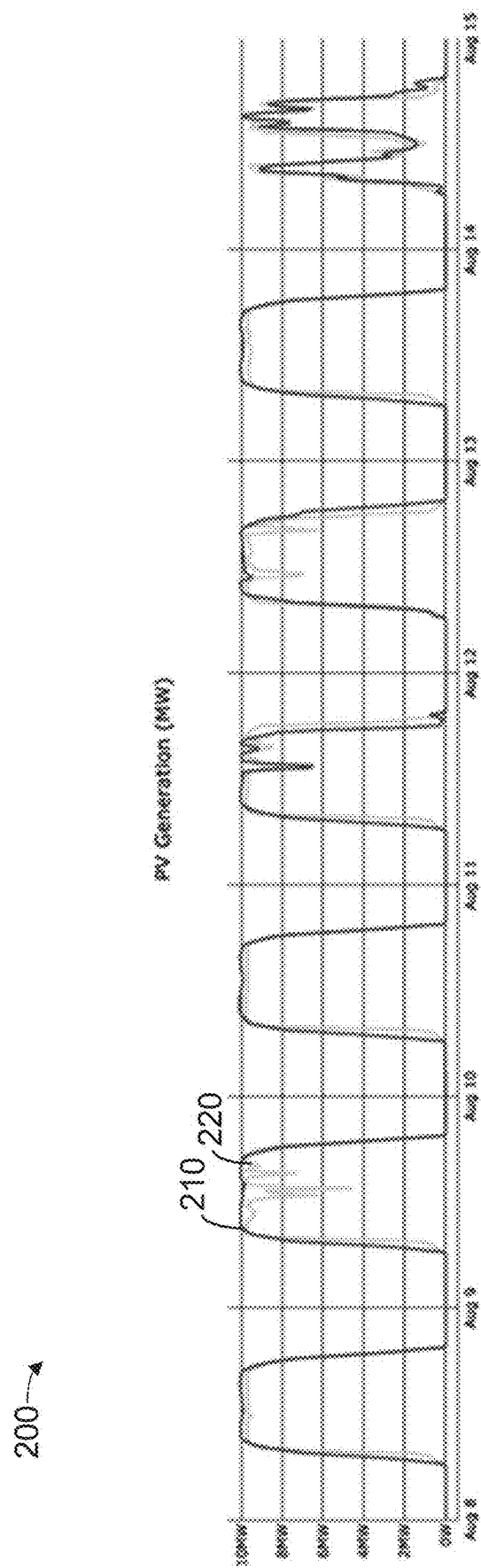
FIG. 2 is an example chart illustrating predicted output and actual output of a renewable energy plant.

In some implementations, the output parameters engine 114 provides the predicted output parameters to a user interface 156 associated with the renewable energy plant 130. The predicted output parameters may be displayed on the user interface 156 to show a current prediction of future output of the renewable energy plant 130. The predicted output parameters can be used for control and/or monitoring of the renewable energy plant 130. The predicted output parameters can be displayed along with the actual output parameters 132 to evaluate an accuracy of the predicted output parameters. An example of displaying the predicted output parameters and the actual output parameters 132 is shown in FIG. 2.

The performance analysis engine 152 may evaluate the predicted output parameters to determine a performance of the renewable energy plant 130. The performance analysis engine 152 may compare the predicted output parameters to the actual output parameters 132 to evaluate an accuracy of the predicted output parameters and/or to identify issues with the renewable energy plant 130. The performance analysis engine 152 can display a comparison of the predicted output parameters to the actual output parameters 132 on the user interface 156. An example of a comparison of the predicted output parameters to the actual output parameters 132 is shown in FIG. 2.

The performance analysis engine 152 may determine root causes for differences between the predicted output and the actual output. In an example, the performance analysis engine 152 may determine that a first set of differences between the predicted output parameters and the actual output parameters 132 is due to non-uniform shading from a geographic feature, such as a hill. In an example, a hill casts a shadow on PV arrays in an unexpected way, causing the predicted output parameters to differ from the actual output parameters 132. In an example, the performance analysis engine 152 may determine that a second set of differences between the predicted output parameters and the actual output parameters 132 is due to error in diffusion solar irradiance models. In some implementations, the performance analysis engine 152 generates an alert for components of the renewable energy plant based on determining that the components cause differences between the predicted output parameters and the actual output parameters 132. In an example, the performance analysis engine 152 determines that degradation of an energy storage device causes a difference between the predicted output parameters and the actual output parameters 132 and generates an alert regarding the degradation of the energy storage device. In an example, the performance analysis engine 152 determines that a difference between the predicted output parameters and the actual output parameters 132 is due to soiling of the PV arrays and generates an alert regarding the soiling of the PV arrays. In an example, the performance analysis engine 152 determines that a difference between the predicted output parameters and the actual output parameters 132 is due to poor PV array tracking and generates an alert regarding the poor tracking for the PV arrays. The alerts generated by the performance analysis engine 152 may include the root causes of issues determined by the performance analysis engine 152. The alerts generated by the performance analysis engine 152 and/or the evaluation of the predicted output parameters generated by the performance analysis engine 152 may be displayed on the user interface 156.

The performance analysis engine 152 may receive the actual environmental data from the meteorological stations 134 of the renewable energy plant 130. The performance analysis engine 152 can use the actual environmental data in comparing the predicted output parameters to the actual output parameters 132. In some implementations, the performance analysis engine 152 adjusts the predicted output parameters based on the actual environmental data. In an example, the performance analysis engine 152 modifies the predicted output parameters based on the predicted output parameters being generated based on an irradiance forecast that was higher than actual irradiance. In some implementations, the performance analysis engine 152 uses the actual environmental data in generating alerts. In an example, the performance analysis engine 152 generates an alert based on the predicted output parameters being lower than expected given the actual environmental parameters. In this example, the performance analysis engine 152 can generate the alert even if the predicted output parameters match the actual output parameters 132. In this example, the predicted output parameters can be based on a lower irradiance in the environmental data than an actual irradiance in the actual environmental data. In this way, the performance analysis engine 152 can identify and generate alerts for issues that might be hidden due to differences between the environmental data and the actual environmental data.

The control engine 154 can use the predicted output parameters from the output parameters engine 114 to generate control signals for the renewable energy plant 130. The control engine 154 may provide control signals such as inverter setpoints, energy storage device charge/discharge, PV array tilt, and other control signals to the renewable energy plant based on the predicted output parameters. The control engine 154 may generate the control signals to increase an efficiency and reduce a degradation of the renewable energy plant 130, using the predicted output parameters. In an example, the control engine 154, based on predicted output parameters indicating a drop in PV array output, may generate an energy storage device charge/discharge signal to cause an energy storage device to store energy to compensate for the predicted drop in PV array output.

In some implementations, the machine-learning model 120 updates the plant parameters 112 using historical data such that the control engine 154 does not generate control signals for the renewable energy plant 130 until a difference between the predicted output parameters and the actual output parameters 132 is below a predetermined threshold. In an example, environmental data from the environmental data database 140 for a past year are used to generate predicted output parameters for the past year, and the predicted output parameters and actual output parameters 132 for the past year are provided as input to the machine-learning model 120 to generate updated plant parameters. In this example, once the plant parameters 112 have been updated based on the past year's data, the plant simulation engine 110 is deployed on live environmental data from the environmental data database 140 to generate predicted output parameters and control signals for the renewable energy plant.

In some implementations, the control engine 154 is not implemented in generating the updated plant parameters using the machine learning model 120. As described above, the machine learning model 120 can be used to refine the simulation of the renewable energy plant 130 in the plant simulation engine 110 in order to make the predicted output parameters more accurate. As discussed herein, the predicted plant parameters can be used by the control engine 154 to generate the control signals for the renewable energy plant 130. However, in some implementations, the predicted plant parameters can be displayed on the user interface 156 without implementing the control engine 154.

In some implementations, the machine-learning model 120 is used to update the plant parameters 112 using live data. In an example, the plant parameters 112 are initialized, the plant simulation engine 110 retrieves live environmental data from the environmental data database 140, the output parameters engine 114 generates predicted output parameters, and the control engine 154 generates control signals for the renewable energy plant 130. In this example, the actual output parameters 132, when measured, are provided to the machine-learning model 120 along with the predicted output parameters to generate updated plant parameters 112. In this example, updated environmental data can be received, predicted output parameters can be generated, control signals can be generated, and updated plant parameters can be generated at regular intervals, such as every fifteen minutes. In some implementations, the machine-learning model 120 is executed to generate the updated plant parameters until a difference between the predicted output parameters and the actual output parameters 132 is below a predetermined threshold. In an example, the machine-learning model 120 is executed to generate the updated plant parameters until a difference between the predicted output parameters and the actual output parameters 132 for a predetermined amount of time.

In some implementations, the machine-learning model 120 is used to update the plant parameters 112 using historical data and live data. In an example, the plant parameters 112 are initialized and then updated by executing the machine-learning model 120 using historical data, as discussed above. Then the plant simulation engine 110 is used to generated predicted output parameters and control signals and the machine-learning model 120 is used to update the plant parameters 112 using live data, as discussed above. In this way, the initial control signals generated by the control engine 154 may be more accurate than if the plant parameters 112 are not "primed" by executing the machine-learning model 120 using the historical data. In some implementations, the machine-learning model 120 is executed to generate the updated plant parameters until a difference between the predicted output parameters and the actual output parameters 132 is below a predetermined threshold.

In some implementations, updating the plant parameters 112 using the machine-learning model 120 using live data allows for tracking changes in parameters of the renewable energy plant. In this way, simulation drift can be avoided by capturing degradation of plant components in the plant parameters 112 and continuously updating how the components of the renewable energy plant 130 respond to environmental data.

In some implementations, the control engine 154 may generate simulated control signals for the output parameters engine 114 for the output parameters engine 114 to generate the predicted output parameters. In this way, the predicted output parameters generated by the output parameters engine 114 can represent an output of the renewable energy plant 130 as controlled in response to the environmental data. The control engine 154 may generate the simulated control signals based on the predicted output parameters. In this way, the output parameters engine 114 and the control engine 154 can generate the predicted output parameters and the simulated control signals in parallel. In an example, the output parameters engine 114 and the control engine 154 can generate the predicted output parameters and the simulated control signals in an iterative process, where intermediate predicted output parameters and intermediate simulated control signals are passed back and forth between the output parameters engine 114 and the control engine 154.

The simulated control signals can include simulated control signals for multiple types of components of the renewable energy plant 130. In an example, the simulated control signals include simulated control signals for a first type of renewable energy asset, such as a PV array, a second type of renewable energy asset, such as a wind turbine, and a third type of renewable energy asset, such as an energy storage device. In this way, the simulated control signals for the multiple types of renewable energy assets can be determined together to optimize the control of the multiple types of renewable energy assets. In some implementations, the control signals provided to the renewable energy plant 130 are based on or are the same as the simulated control signals generated by the control engine 154.

The plant simulation engine 110 may include one or more processors and one or more non-transitory, computer-readable media including instructions which, when executed by the one or more processors, cause the one or more processors to perform operations performed by the plant simulation engine 110 as discussed herein. In some implementations, the machine-learning model 120 is executed using the one or more processors of the plant simulation engine 110 using instructions included in the one or more non-transitory, computer-readable media including instructions of the plant simulation engine 110. In some implementations, the machine-learning model 120 is executed using additional one or more processors executing instructions included in additional one or more non-transitory, computer-readable media.

FIG. 2 is an example chart 200 illustrating predicted output 210 and actual output 220 of a renewable energy plant. The chart 200 may be displayed on a user interface of the renewable energy plant to compare the predicted output 210 and the actual output 220. The predicted output 210 may be displayed first, as the predicted output 210 is generated, and then the actual output 220 may be added later, as the actual output 220 is measured. In an example, the predicted output 210 is generated for a week, and the actual output 220 is added throughout the week as the actual output 220 is measured. In an example, the predicted output 210 is generated one hour before the actual output 220 is measured, such that the predicted output 210 leads the actual output 220 by one hour. In some implementations, the chart 200 is provided to a machine-learning model, such as the machine-learning model 120 of FIG. 1, to generate updated plant parameters for a simulation or digital twin of the renewable energy plant based on a comparison of the predicted output 210 and the actual output 220. In some implementations, the chart 200 is provided to a user interface for display, such as the user interface 156 of FIG. 1.

Figure 3:
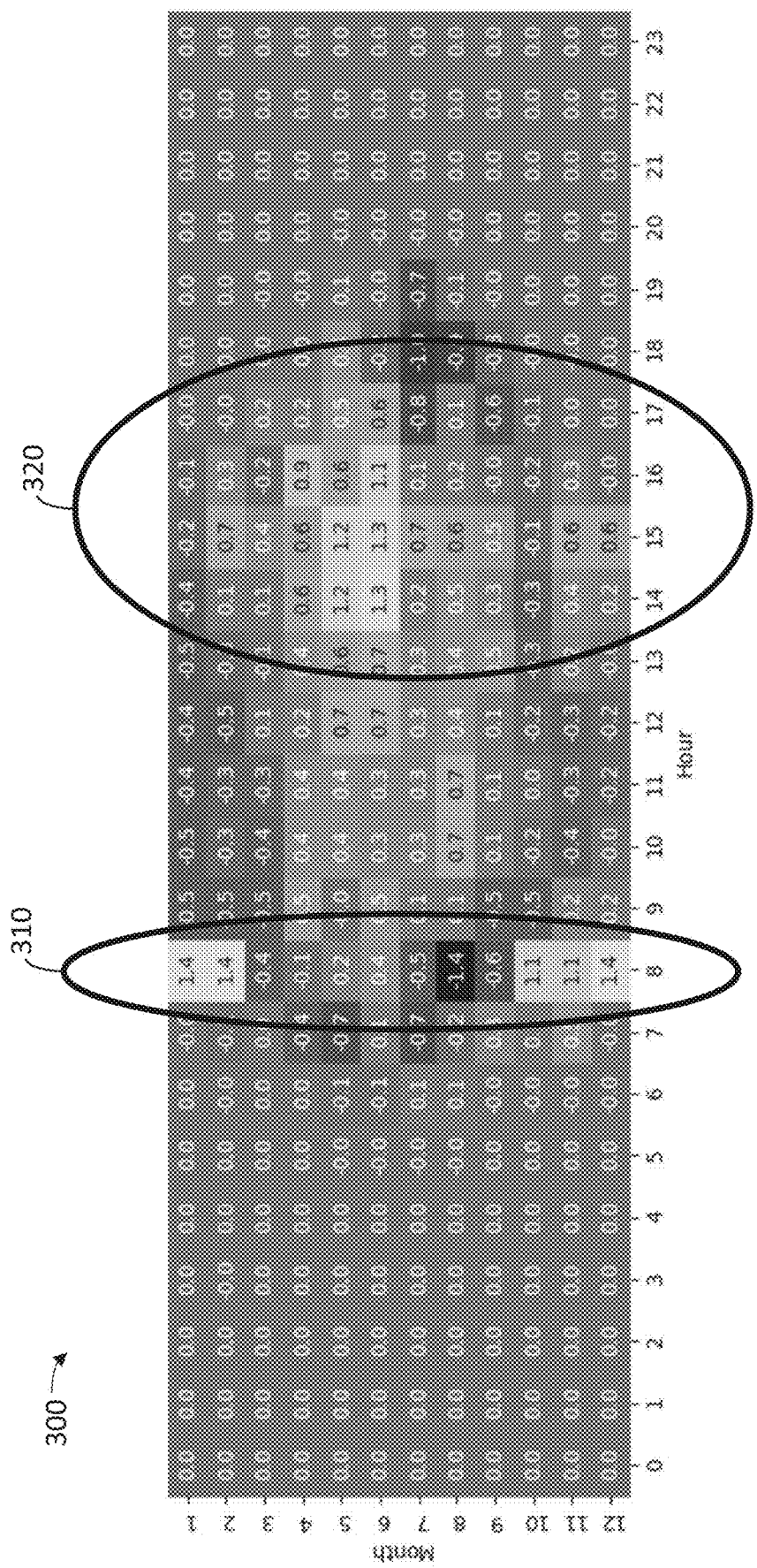
FIG. 3 is an example grid illustrating a difference between predicted output and actual output of a renewable energy plant.

FIG. 3 is an example grid 300 illustrating a difference between predicted output and actual output of a renewable energy plant. The grid 300 may include cells that each indicate a difference between the predicted output and the actual output for an averaged hour of day in a month. In an example, the top-left cell indicates an average difference of zero between the predicted output and the actual output for the hour between midnight and 1:00 am, averaged over each day in the month of January. The grid 300 may show inaccuracies in the predicted output. The grid 300 may be provided to a machine-learning model, such as the machine-learning model 120 of FIG. 1, to generate updated plant parameters for a simulation or digital twin of the renewable energy plant based on the differences between the predicted output and the actual output.

In some implementations, the machine-learning model may determine root causes for the differences between the predicted output and the actual output. In an example, the machine-learning model may determine that a first region of differences 310 between the predicted output and the actual output in the grid 300 is due to non-uniform shading from a geographic feature, such as a hill. In an example, a hill casts a shadow on PV arrays in an unexpected way, causing the predicted output to differ from the actual output. In an example, the machine-learning model may determine that a second region of differences 320 between the predicted output and the actual output in the grid 300 is due to error in diffusion solar irradiance models. The machine-learning model may update plant parameters of the renewable energy plant to address the differences between the predicted output and the actual output. In some implementations, the machine-learning model generates an alert for components of the renewable energy plant based on determining that the components cause differences between the predicted output and the actual output. In an example, the machine-learning model determines that degradation of an energy storage device causes a difference between the predicted output and the actual output and generates an alert regarding the degradation of the energy storage device.

In some implementations, the grid 300 is included in a plurality of grids illustrating differences between predicted and actual output. The grid 300 may show a difference between predicted and actual output for the renewable energy plant in megawatts. Other grids may show differences between predicted and actual output for specific components or subsystems of the renewable energy power plant.

Although not illustrated, plant parameters of the renewable energy power plant may be similar to the grid 300. The plant parameters can include 12×24 parameter grids such as grids for degradation of different components, wire losses, global horizontal irradiance, direct irradiance, and other plant parameters. The parameter grids can be initialized with default or nominal values and then updated by the machine-learning model. In some implementations, the machine-learning model receives as input the grid 300 and outputs parameter grids that are updated based on the grid 300.

Figure 4:
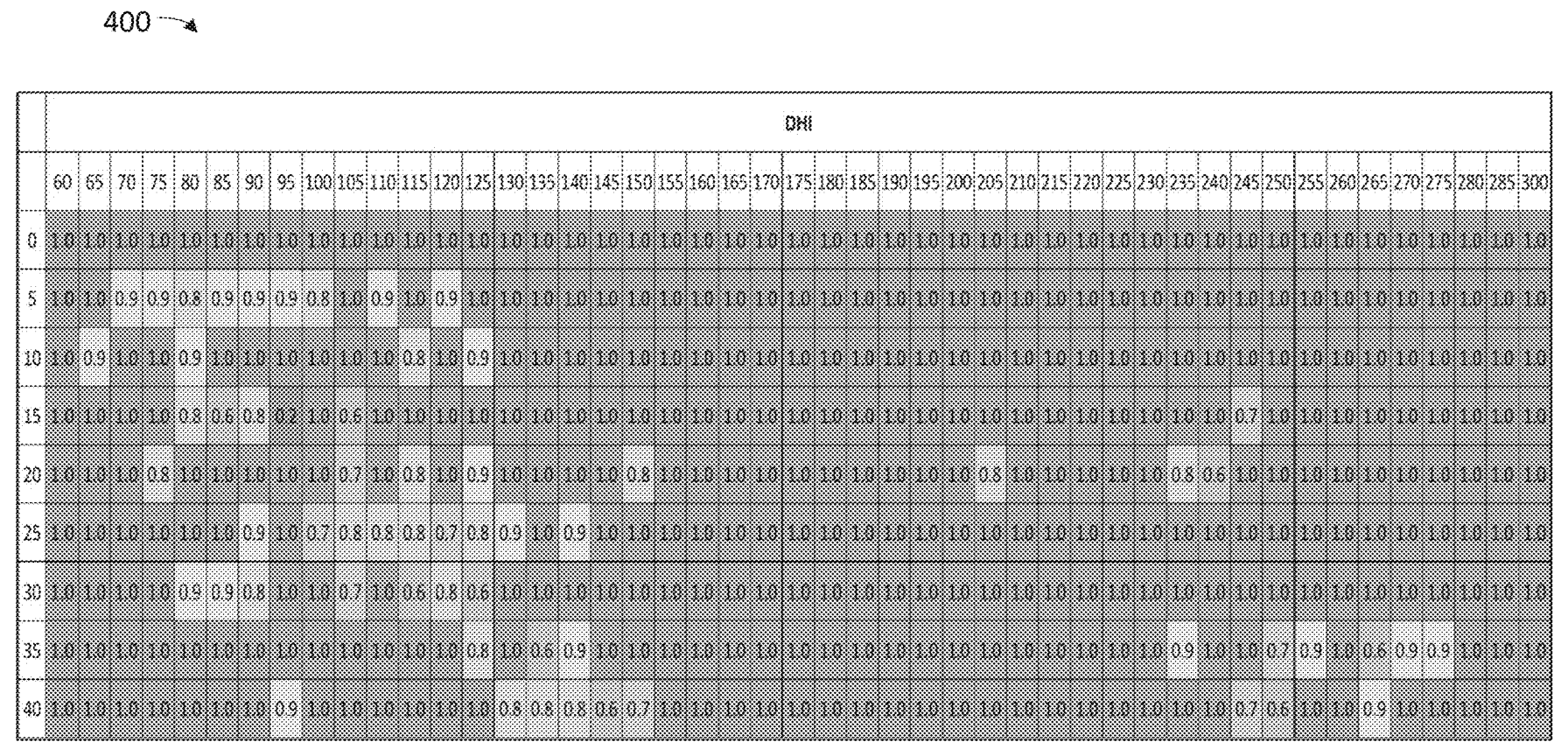

FIG. 4 is an example grid 400 illustrating irradiance correction factors for diffuse horizontal irradiance (DHI). The grid 400 may be used in the system 100 of FIG. 1. In some implementations, the grid 400 is an output of the machine learning model 120 of FIG. 1 to modify the predicted output parameters generated by the plant simulation engine 110 of FIG. 1. The machine learning model 120 may generate the grid 400 to reduce a difference between the predicted output parameters and the actual output parameters 132. The grid 400 may include cells that each indicate a correction factor for DHI for a solar elevation and azimuth. The horizontal axis of the grid 400 includes azimuth values ranging from 60° to 300° in increments of 5°. The vertical axis of the grid 400 includes elevation values ranging from 0° to 40° in increments of 5°. The correction factors may be multiplied by the DHI values for the respective elevation and azimuth values in order to modify the predicted output parameters of the renewable energy plant. In an example, the grid 400 includes a correction factor of 0.8 for DHI at 20° elevation and 75° azimuth, meaning that a DHI value at 20° elevation and 75° azimuth is multiplied by 0.8 when generating the predicted output parameters.

The elevation and azimuth values in the grid 400 may correspond to hours in the grid 300. In an example, the sunrise azimuth may be 120° in winter and 60° in summer, and the solar elevation changes throughout the day as the sun rises and sets. The path of the sun is different day to day, meaning that different combinations of azimuth and elevation values in the grid 400 can correspond to multiple hours in the grid 300 of FIG. 3. In an example, a cell in the grid 400 corresponds to two cells in the grid 300 of FIG. 3, corresponding to the two hours in a year when the sun is at the same position in the sky.

In some implementations, the grid 400 includes more elevation values than shown. The grid 400 may include values corresponding to observed values for a geographic location. In some implementations, the grid 400 excludes some values to reduce a computation burden of generating the grid 400. In an example, the grid includes elevation values up to 40° with higher elevation values ignored to reduce the computational burden of generating the grid 400. However, the grid 400 may include all elevation values observed for a geographical location or may exclude different values for reducing the computational burden.

Figure 5:
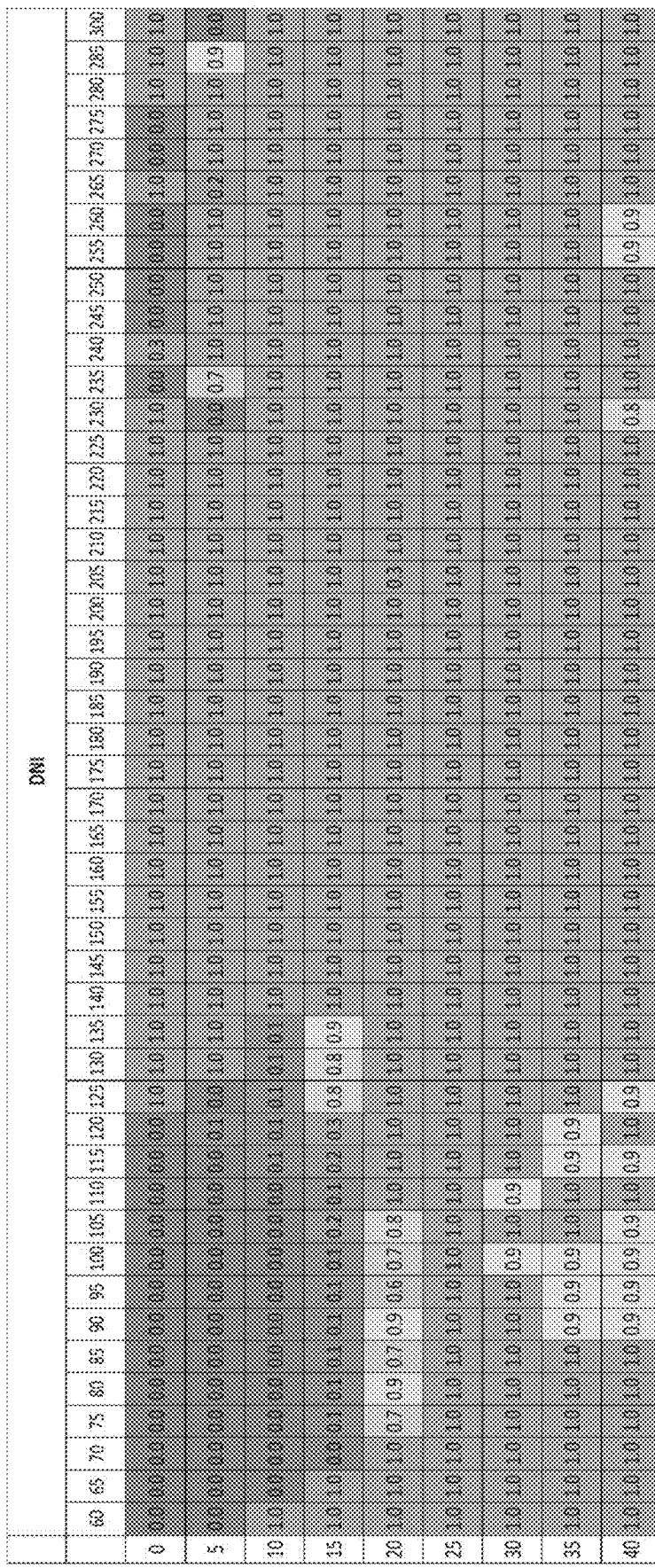
FIG. 5 is an example grid illustrating irradiance correction factors for direct normal irradiance (DNI).

FIG. 5 is an example grid 500 illustrating irradiance correction factors for direct normal irradiance (DNI). The grid 500 may be used in the system 100 of FIG. 1. In some implementations, the grid 500 is an output of the machine learning model 120 of FIG. 1 to modify the predicted output parameters generated by the plant simulation engine 110 of FIG. 1. The machine learning model 120 may generate the grid 500 to reduce a difference between the predicted output parameters and the actual output parameters 132. The grid 500 may include cells that each indicate a correction factor for DNI for a solar elevation and azimuth. The horizontal axis of the grid 500 includes azimuth values ranging from 60° to 300° in increments of 5°. The vertical axis of the grid 500 includes elevation values ranging from 0° to 40° in increments of 5°. The correction factors may be multiplied by the DNI values for the respective elevation and azimuth values in order to modify the predicted output parameters of the renewable energy plant. In an example, the grid 500 includes a correction factor of 0.0 for DNI at 15° elevation and 70° azimuth, meaning that a DNI value at 15° elevation and 70° azimuth is multiplied by 0.0 when generating the predicted output parameters. In this example, the correction factor of 0.0 can correspond to shading, indicating that there is no DNI.

The elevation and azimuth values in the grid 500 may correspond to hours in the grid 300. In an example, the sunrise azimuth may be 120° in winter and 60° in summer, and the solar elevation changes throughout the day as the sun rises and sets. The path of the sun is different day to day, meaning that different combinations of azimuth and elevation values in the grid 500 can correspond to multiple hours in the grid 300 of FIG. 3. In an example, a cell in the grid 500 corresponds to two cells in the grid 300 of FIG. 3, corresponding to the two hours in a year when the sun is at the same position in the sky.

In some implementations, the grid 500 includes more elevation values than shown. The grid 500 may include values corresponding to observed values for a geographic location. In some implementations, the grid 500 excludes some values to reduce a computation burden of generating the grid 500. In an example, the grid includes elevation values up to 40° with higher elevation values ignored to reduce the computational burden of generating the grid 500. However, the grid 500 may include all elevation values observed for a geographical location or may exclude different values for reducing the computational burden.

The correction factors in the grid 400 of FIG. 4 and the grid 500 may be each applied to DHI and DNI values, respectively, when calculating the predicted output parameters. In some implementations, the grid 400 and the grid 500 are generated by a machine learning model (e.g., the machine learning model 120 of FIG. 1) executed using as input the grid 300 of FIG. 3. In this way, the correction factors can be generated to reduce a difference between predicted and actual output parameters. In some implementations, the grid 400 and the grid 500 are generated together, such that the machine learning model outputs combinations of DHI correction factors and DNI correction factors for each elevation and azimuth combination. In some implementations, the grid 400 and the grid 500 are generated separately. Other grids than the example grids 400 and 500 may be generated to reduce a difference, or error, between predicted and actual output parameters. In an example, grids of correction factors can be generated for global horizontal irradiance (GHI), plane of array (POA), albedo, auxiliary losses, auxiliary losses, transmission line losses, light-induced degradation of the PV arrays and/or inverters, DC wire losses for the PV arrays and/or inverters, module quality of the PV arrays and/or inverters, slope azimuth for the PV arrays and/or inverters, slope tilt for the PV arrays and/or inverters, soiling losses for the PV arrays, module degradation rates for the PV arrays and/or inverters, AC wire losses for the inverters, and other environmental or equipment parameters.

Figure 6:
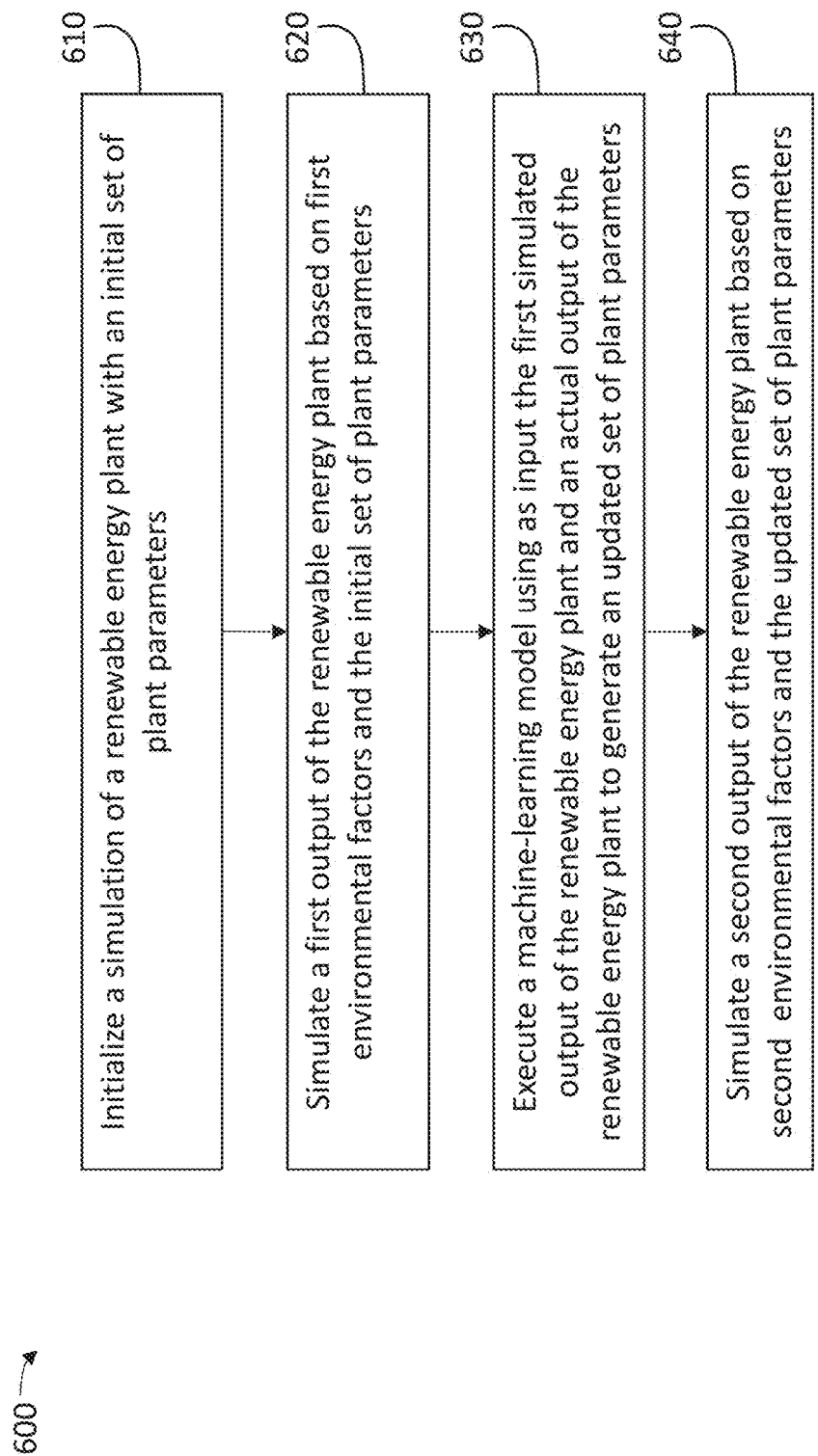
FIG. 6 is a flow chart illustrating example operations of a method for using a machine-learning model to refine parameters of a renewable energy plant.

FIG. 6 is a flow chart illustrating example operations of a method 600 for using a machine-learning model to refine parameters of a renewable energy plant. The method 600 may include more, fewer, or different operations than shown. The operations may be performed in the order shown, in a different order, or concurrently.

At operation 610, a simulation (e.g., digital twin) of a renewable energy plant is initialized with an initial set of parameters. The initial set of parameters may include default or nominal values for components (e.g., PV arrays, wind turbines, energy storage devices) of the renewable energy plant.

At operation 620, a first output of the renewable energy plant is simulated based on first environmental factors and the initial set of plant parameters. The first environment factors may include weather, solar irradiance, wind, temperature, and other factors affecting power generation, transmission, and storage by components of the renewable energy plant. The first environmental factors may be applied to the initial set of plant parameters to determine how the components of the renewable energy plant, having the initial set of plant parameters, respond to the first environmental factors. In an example, the first environmental factors include solar irradiance over the course of a day, and the solar irradiance is applied to PV array efficiencies from the initial set of plant parameters to determine how much power PV arrays of the renewable energy plant produce from the solar irradiance.

In some implementations, the first environmental factors include historical weather data. The historical weather data may be used in order to compare the first simulated output to actual output of the renewable energy plant for the same time period. In an example, historical weather data for Jun. 12, 2024 is used to generate the first simulated output which is then compared to an actual output of the renewable energy plant on Jun. 12, 2024.

In some implementations, the first environmental factors include a forecast of weather data. The forecast of weather data may be used in order to predict a response (e.g., output) of the renewable energy plant to the forecasted weather data. The predicted response may be used to adjust control signals for components of the renewable energy plant or to modify a power profile for the renewable energy plant. The forecast of weather data may extend two hours, twenty-four hours, forty-eight hours, or any number of hours into the future, allowing for the first simulated output to represent a future prediction of output into the future corresponding to the forecast of weather data.

At operation 630, a machine-learning model is executed using as input the first simulated output of the renewable energy plant and an actual output of the renewable energy plant to generate an updated set of plant parameters. As discussed herein, the machine-learning model may update various different interconnected parameters to reduce a difference between the first simulated output and the actual output of the renewable energy plant.

At operation 640, a second output of the renewable energy plant is simulated based on second environmental factors and the updated set of plant parameters. The second simulated output may be generated similar to the first simulated output, but using the updated set of plant parameters as generated by the machine-learning model.

In some implementations, simulating the second output of the renewable energy plant includes generating one or more simulated control signals for the renewable energy plant based on the second environmental factors. The simulated control signals may include a first simulated control signal for a first type of renewable energy asset and a second simulated control signal for a second type of renewable energy asset. In an example, the first simulated control signal is a charge/discharge for an energy storage device and the second simulated control signal is an inverter setpoint. By generating simulated control signals for different types of renewable energy assets, the control of the various components of the renewable energy plant can be co-optimized to match a target power profile while reducing component degradation. In an example, simulated control signals are generated for PV arrays, energy storage devices, hydroelectric turbines, and wind turbines to maximize an hourly carbon-free energy match against a target power profile.

In some implementations, the simulation or digital twin of the renewable energy power plant includes multiple simulated controllers corresponding to controllers of the renewable energy power plant. Generating the simulated control signals may include generating the simulated control signals using the multiple simulated controllers. In an example, the simulation or digital twin of the renewable energy power plant includes a PV cluster controller, a BMS controller, and a wind cluster controller corresponding to actual controllers of the renewable energy plant.

The first simulated output of the renewable energy power plant may be generated using simulated control signals, similar to the second simulated output.

In some implementations, the method includes providing the one or more simulated control signals to the renewable energy plant as control signals. The simulated control signals may be provided to the renewable energy plant as control signals such that the actual output of the renewable energy plant is optimized similar to the predicted output of the renewable energy plant. In some implementations, providing the simulated control signals as control signals includes transmitting simulated control signals generated by the multiple simulated controllers to the corresponding actual controllers of the renewable power plant.

In some implementations, the second simulated output includes a simulated output for each component of a plurality of components of the renewable energy plant. The second simulated output may be a granular simulated output including outputs for individual components of the renewable energy power plant. The simulated output for each component of the plurality of components of the renewable energy plant can provide for a more accurate overall simulated output, more accurate updates to the plant parameters, and identification of degradation or other issues for individual components. In an example, a difference between a simulated output for a PV array and an actual output for the PV array may indicate damage to the PV array or soiling of the PV array.

In some implementations, the second simulated output of the renewable energy plant is displayed on a user interface. The second simulated output can be displayed with an actual output of the renewable energy plant. In an example, the first simulated output, corresponding to a first time interval, and the second simulated output, corresponding to a second, subsequent time interval, are displayed on the user interface to show simulated output of the renewable energy plant over the first time interval and the second time interval. In an example, the first simulated output corresponds to a first time interval and the second simulated output corresponds to the first time interval such that the first simulated output is updated to be the second simulated output based on the updated plant parameters to improve upon the first simulated output for the first time interval.

In some implementations, the method 600 includes generating one or more control signals for the renewable energy plant based on the second simulated output of the renewable energy plant. In an example, the second simulated output indicates a drop in PV production, and the one or more control signals cause energy storage devices of the renewable energy plant to begin to discharge in anticipation of the drop in PV production. In this way, the second simulated output can provide for reducing a ramp-up rate of the energy storage devices that may be required to respond to the drop in PV production.

In some implementations, the method 600 includes comparing the second simulated output to a second actual output of the renewable energy plant to generate an alert regarding one or more components of the renewable energy plant. As discussed herein, the alert may indicate degradation of the one or more components, damage to the one or more components, or a design flaw related to the one or more components. In an example, a difference between a simulated output of a PV cluster and an actual output of the PV cluster may indicate soiling of the PV cluster, wire losses from the PV cluster, or other issues. In this example, a comparison of predicted outputs of individual PV arrays within the PV cluster to actual output of the individual PV arrays may allow for more granular alerts and diagnosis of issues.

In some implementations, the method 600 includes executing the machine-learning model using as input the second simulated output of the renewable energy plant and a second actual output of the renewable energy plant to generate a second updated set of plant parameters. In this way, the plant parameters can be updated to reflect the renewable energy plant's response to the second environmental factors to improve an accuracy of the simulation or digital twin of the renewable energy plant. The plant parameters can be iteratively updated, as discussed herein, to refine the digital twin to more accurately reflect the renewable energy plant.

The foregoing detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a model stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the monitoring device 102) to perform actions by operating on input data and generating an output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method for controlling a renewable energy plant using an improved digital twin simulation, comprising:
   initializing, by one or more processors, a digital twin simulation of a renewable energy plant with an initial set of plant parameters, wherein the renewable energy plant comprises a plurality of renewable energy assets including at least photovoltaic arrays, and wherein the initial set of plant parameters include nominal parameters for the plurality of renewable energy assets;
   simulating, by the one or more processors, a first output of the renewable energy plant based on first environmental factors and the initial set of plant parameters;
   iteratively executing, by the one or more processors, a machine-learning model using as input the first simulated output of the renewable energy plant and an actual output of the renewable energy plant to generate updated sets of plant parameters that reduce differences between the simulated output and the actual output until a difference between the simulated output and the actual output is below a predetermined threshold, wherein an updated set of plant parameters that causes the difference between the simulated output and the actual output to be below the predetermined threshold includes estimated parameters for the plurality of renewable energy assets to refine the digital twin simulation to more accurately reflect the renewable energy plant;

simulating, by the one or more processors, a second output of the renewable energy plant based on second environmental factors and the updated set of plant parameters; and automatically generating and transmitting, by the one or more processors, control signals to the plurality of renewable energy assets, wherein the control signals modify operation of the renewable energy plant based on the second simulated output to optimize power generation.

2. The method of claim 1, wherein simulating the second output of the renewable energy plant includes generating one or more simulated control signals for the renewable energy plant based on the second environmental factors.

3. The method of claim 2, wherein the one or more simulated control signals include a first simulated control signal for a first type of renewable energy asset and a second simulated control signal for a second type of renewable energy asset.

4. The method of claim 2, further comprising providing the one or more simulated control signals to the renewable energy plant as control signals.

5. The method of claim 1, wherein the first environmental factors include historical weather data.

6. The method of claim 1, wherein the second environmental factors include a forecast of weather data.

7. The method of claim 1, further comprising executing the machine-learning model using as input the second simulated output of the renewable energy plant and a second actual output of the renewable energy plant to generate a second updated set of plant parameters.

8. The method of claim 1, wherein the second simulated output includes a simulated output for each component of a plurality of components of the renewable energy plant.

9. The method of claim 1, further comprising comparing the second simulated output to a second actual output of the renewable energy plant to generate an alert regarding one or more components of the renewable energy plant.

10. A non-transitory, computer-readable medium including instructions which, when executed by one or more processors, cause the one or more processors to:

initialize a digital twin simulation of a renewable energy plant with an initial set of plant parameters, wherein the renewable energy plant comprises a plurality of renewable energy assets including at least photovoltaic arrays, and wherein the initial set of plant parameters include nominal parameters for the plurality of renewable energy assets;

simulate a first output of the renewable energy plant based on first environmental factors and the initial set of plant parameters;

iteratively execute a machine-learning model using as input the first simulated output of the renewable energy plant and an actual output of the renewable energy plant to generate updated sets of plant parameters that reduce differences between the simulated output and the actual output until a difference between the simulated output and the actual output is below a predetermined threshold, wherein an updated set of plant parameters that causes the difference between the simulated output and the actual output to be below the predetermined threshold includes estimated parameters for the plurality of renewable energy assets to refine the digital twin simulation to more accurately reflect the renewable energy plant;

simulate a second output of the renewable energy plant based on second environmental factors and the updated set of plant parameters; and automatically generate and transmit control signals to the plurality of renewable energy assets, wherein the control signals modify operation of the renewable energy plant based on the second simulated output to optimize power generation.

11. The non-transitory, computer-readable medium of claim 10, wherein the instructions cause the one or more processors to simulate the second output of the renewable energy plant by generating one or more simulated control signals for the renewable energy plant based on the second environmental factors.

12. The non-transitory, computer-readable medium of claim 11, wherein the one or more simulated control signals include a first simulated control signal for a first type of renewable energy asset and a second simulated control signal for a second type of renewable energy asset.

13. The non-transitory, computer-readable medium of claim 11, wherein the instructions cause the one or more processors to provide the one or more simulated control signals to the renewable energy plant as control signals.

14. The non-transitory, computer-readable medium of claim 10, wherein the first environmental factors include historical weather data.

15. The non-transitory, computer-readable medium of claim 10, wherein the second environmental factors include a forecast of weather data.

16. The non-transitory, computer-readable medium of claim 10, wherein the instructions cause the one or more processors to execute the machine-learning model using as input the second simulated output of the renewable energy plant and a second actual output of the renewable energy plant to generate a second updated set of plant parameters.

17. The non-transitory, computer-readable medium of claim 10, wherein the second simulated output includes a simulated output for each component of a plurality of components of the renewable energy plant.

18. The non-transitory, computer-readable medium of claim 10, wherein the instructions cause the one or more processors to compare the second simulated output to a second actual output of the renewable energy plant to generate an alert regarding one or more components of the renewable energy plant.

* * * * *